United States Patent [19]

Stamness et al.

[11] Patent Number: 5,025,327
[45] Date of Patent: Jun. 18, 1991

[54] MAGNETIC DISK WRITE PRECOMPENSATION METHOD AND APPARATUS WHICH TAKES INTO ACCOUNT VARIATIONS IN HEAD/DISK CHARACTERISTICS

[75] Inventors: Jesse I. Stamness, Los Altos Hills; Raymond W. Morrow, San Jose; Edward E. Asato, Sunnyvale, all of Calif.

[73] Assignee: Unisys Corp., Detroit, Mich.

[21] Appl. No.: 920,004

[22] Filed: Oct. 17, 1986

[51] Int. Cl.$^5$ .............................................. G11B 5/09
[52] U.S. Cl. ........................................ 360/45; 360/27
[58] Field of Search ....................... 360/31, 45, 46, 65, 360/27, 51

[56] References Cited

U.S. PATENT DOCUMENTS

| | | | |
|---|---|---|---|
| 3,932,894 | 1/1976 | Arter et al. | 360/51 |
| 4,245,263 | 1/1981 | Rathbun et al. | 360/45 |
| 4,279,005 | 7/1981 | Kitamura et al. | 360/65 |
| 4,295,168 | 10/1981 | Müller | 360/31 |
| 4,398,225 | 9/1983 | Cornaby et al. | 360/46 |
| 4,481,549 | 11/1984 | Theus | 360/45 |
| 4,607,295 | 9/1986 | Uno | 360/46 |
| 4,612,586 | 9/1986 | Sordello et al. | 360/45 |
| 4,633,336 | 12/1986 | Horie et al. | 360/45 |
| 4,938,183 | 2/1976 | Hust et al. | 360/27 |

FOREIGN PATENT DOCUMENTS

| | | |
|---|---|---|
| 5786119 | 11/1980 | Japan . |
| 59191117 | 4/1983 | Japan . |
| 58-141410 | 8/1983 | Japan . |
| 61-156574 | 7/1986 | Japan . |

OTHER PUBLICATIONS

IBM TDB, "Dynamin Write Precompensation", vol. 22, No. 5, Oct. 1979 p. 2091.
IBM TDB, "Write Data Wrap Test", vol. 26, No. 10A, Mar. 1984 p. 4879.
Electronics International, "Winchester Electronics Functions Fit on Four High-Speed Chips", vol. 55, No. 12, Jun. 1982, p. 117.

*Primary Examiner*—David J. Severin
*Attorney, Agent, or Firm*—Nathan Cass; Mark T. Starr

[57] ABSTRACT

Write precompensation data is recorded on a disk of a magnetic disk drive indicating the write compensation to be provided for each of a plurality of head/media combination which may have relatively wide variations in performance characteristics. Apparatus is provided for transferring and storing this write precompensation data in the disk controller at start-up and for accessing this stored data during each write operation to provide a "tailored" write precompensation for the particular head/media combination to be employed for the writing operation.

21 Claims, 2 Drawing Sheets

MAGNETIC DISK WRITE PRECOMPENSATION METHOD AND APPARATUS WHICH TAKES INTO ACCOUNT VARIATIONS IN HEAD/DISK CHARACTERISTICS

BACKGROUND OF THE INVENTION

The present invention relates generally to improved digital data storage means, and more particularly to improved means and methods for providing write precompensation in a magnetic data storage system.

As is well known, disk drives are an important part of most modern day computer systems and there is a continuing effort to increase the storage density and reliability of such disk drives at minimum cost. As is also well known, a major problem with magnetic disk drives arises as a result of the "bit shift" occurring because of the crowding of flux reversals at high densities. Bit shift is also affected by the encoding pattern being recorded as well as by electrical and mechanical noise. During detection of the magnetically stored data, the presence of bit shift causes a bit to be detected at a time shifted by a certain amount from the expected time of detection, which, if sufficiently large compared to the bit-cell time, can cause data errors.

Known approaches for overcoming the bit shift problem (for example, see U.S. Pat. Nos. 4,245,263, 4,481,549 and 4,607,295) involve the use of what is commonly referred to as "write precompensation" which attempts to eliminate bit shift by employing predetermined precompensation of the digital data prior to its being written on the magnetic medium. These known write precompensation approaches rely on head/media performing in accordance with relatively narrow specifications. This can cause a severe yield problem during manufacture, particularly for high density systems where tolerances are tight. In addition, this reliance on narrow head/media performance specifications can increase the likelihood of uncorrectable failure, since relatively small changes in head/media characteristics after installation can defeat the write precompensation provided.

OBJECTS AND SUMMARY OF THE INVENTION

It is accordingly a broad object of the present invention to provide improved means and methods for providing write precompensation in a magnetic storage system, such as a magnetic disk drive.

A more specific object in accordance with the invention is to provide improved write precompensation means and methods such that satisfactory write precompensation can be provided over a relatively wide range of head/media performance specifications.

Another object of the invention in accordance with one or more of the foregoing objects is to provide write precompensation means which can readily be changed to accommodate changes in head/media performance characteristics.

An additional object of the invention is to provide improved means and methods for economically implementing the foregoing objects.

In a particular preferred embodiment of the invention directed to a peripheral system including one or more magnetic disk drives, write precompensation data is recorded on the head/disk assembly (HDA) of each disk drive indicating the performance characteristics of each of the plurality of head/media combinations provided by the HDA. This write precompensation data may, for example, be recorded on the surface analysis tracks typically provided on an HDA. When the system is turned on, the head/media write precompensation data recorded on the HDAs is read into the disk drive controller. Then, during each writing operation, this write precompensation data is accessed to provide a "tailored" write precompensation which not only takes into account the particular data pattern to be written and the track on which the data is to be written, but also takes into account the head/media performance of the particular head to be used for writing. The preferred embodiment also provides for determining whether the recorded write precompensation data for any of the head/media combinations needs to be corrected, and for changing the recorded write precompensation data accordingly.

The specific nature of the invention as well as other objects, features, advantages and uses thereof will become evident from the following description of a preferred embodiment taken in conjunction with the accompanying drawing.

DESCRIPTION OF A PREFERRED EMBODIMENT

Like characters and numbers refer to like elements throughout the figures of the drawings.

Figure 1:
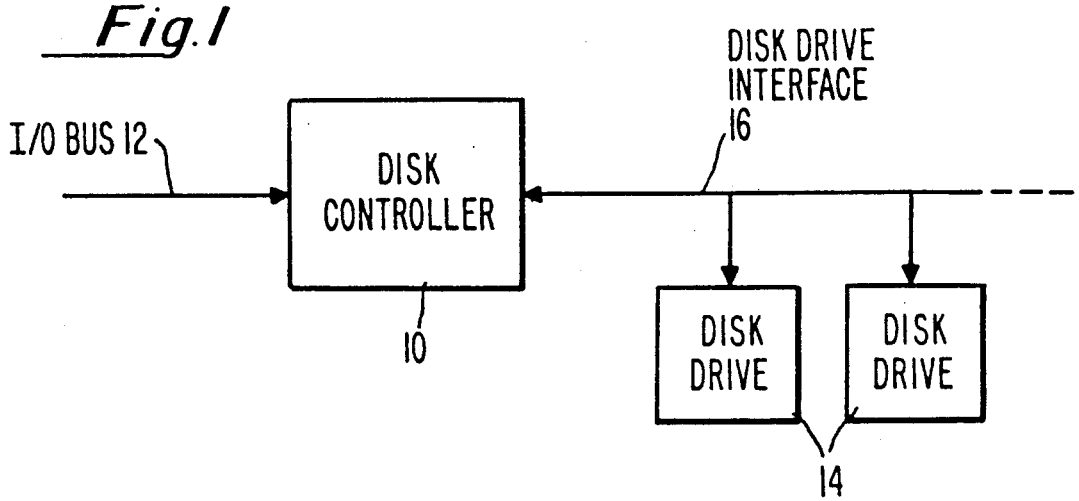
FIG. 1 is a schematic block diagram illustrating a conventional disk drive system to which the preferred embodiment of the invention may be applied.

Referring initially to FIG. 1, illustrated therein is a conventional disk drive system comprising a disk controller 10 having an input/output bus 12 and communicating with a plurality of disk drives 14 via a disk drive interface 16. As is conventional, each disk drive 14 includes a head/disk assembly (HDA) providing a plurality of controllable head/media combinations for reading and/or writing on selected tracks of the HDA.

Figure 2:
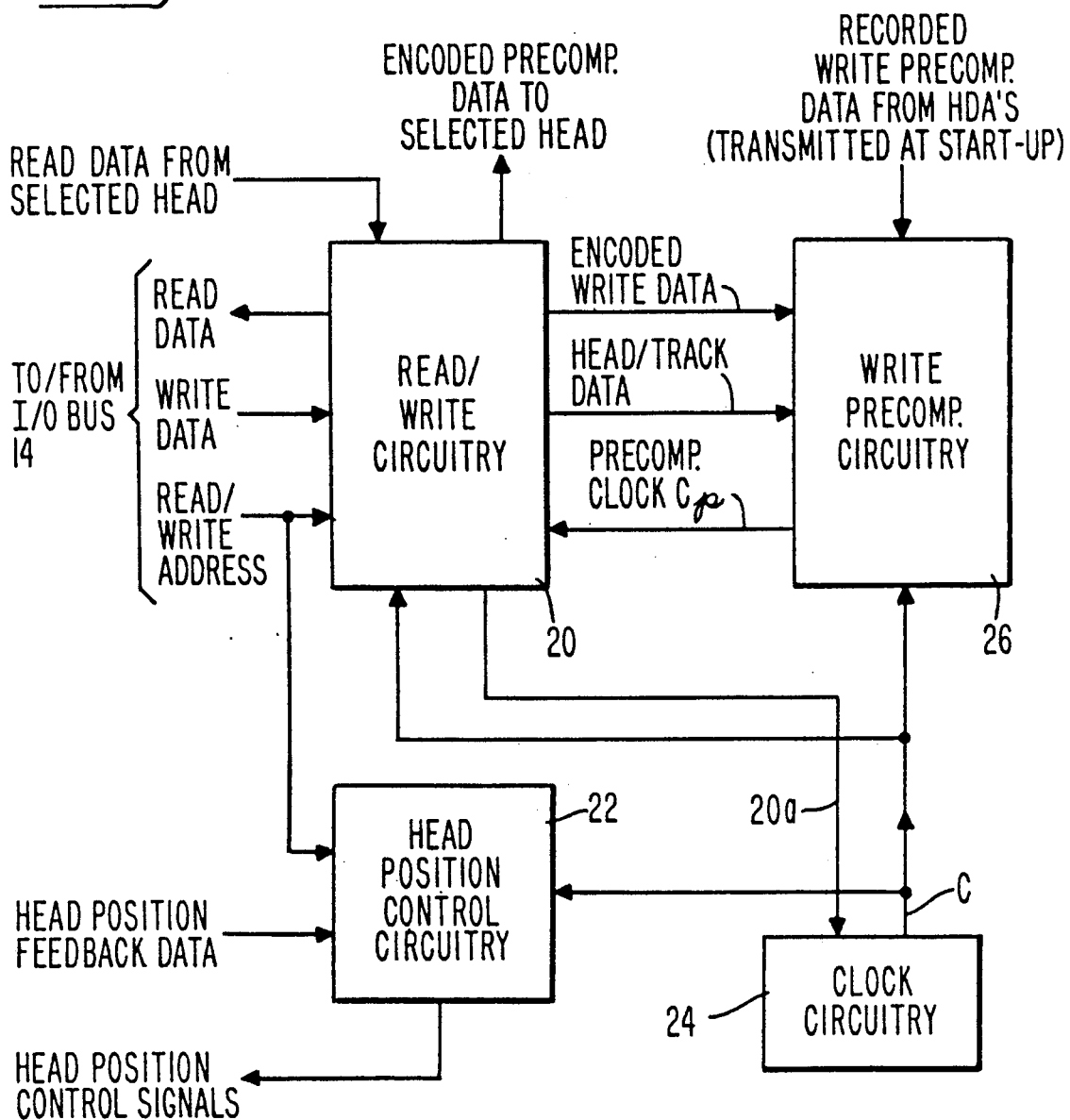
FIG. 2 is an electrical block diagram illustrating a disk controller incorporating a particular preferred embodiment of the invention.

FIG. 2 illustrates how a preferred embodiment of the invention may be incorporated in the disk controller 10 of FIG. 1. As shown in FIG. 2, the disk controller includes conventional read/write circuitry 20 which communicates with the HDA of each disk drive to provide for reading and writing of digital data on the disks at locations specified by a read/write address. As is typical, the disk controller includes head position control circuitry 22 responsive to applied read/write addresses and disk head position feedback data from the HDAs for controlling head positioning. In accordance with the invention, the disk controller further includes write precompensation circuitry 26 which, in response to encoded write data and head/track data provided by read/write circuitry 20, generates a write data precompensation clock $C_p$ which is applied to the read/write circuitry 20 for use in providing write precompensation for data to be written on the disk drives. Clock circuitry 24 in FIG. 2 serves to provide clocking for the various components of the disk controller in a conventional manner. As is also conventional, clock circuitry 24 receives signals 20a from the read/write circuitry 20 related to disk drive operation for controlling clocking.

Figure 3:
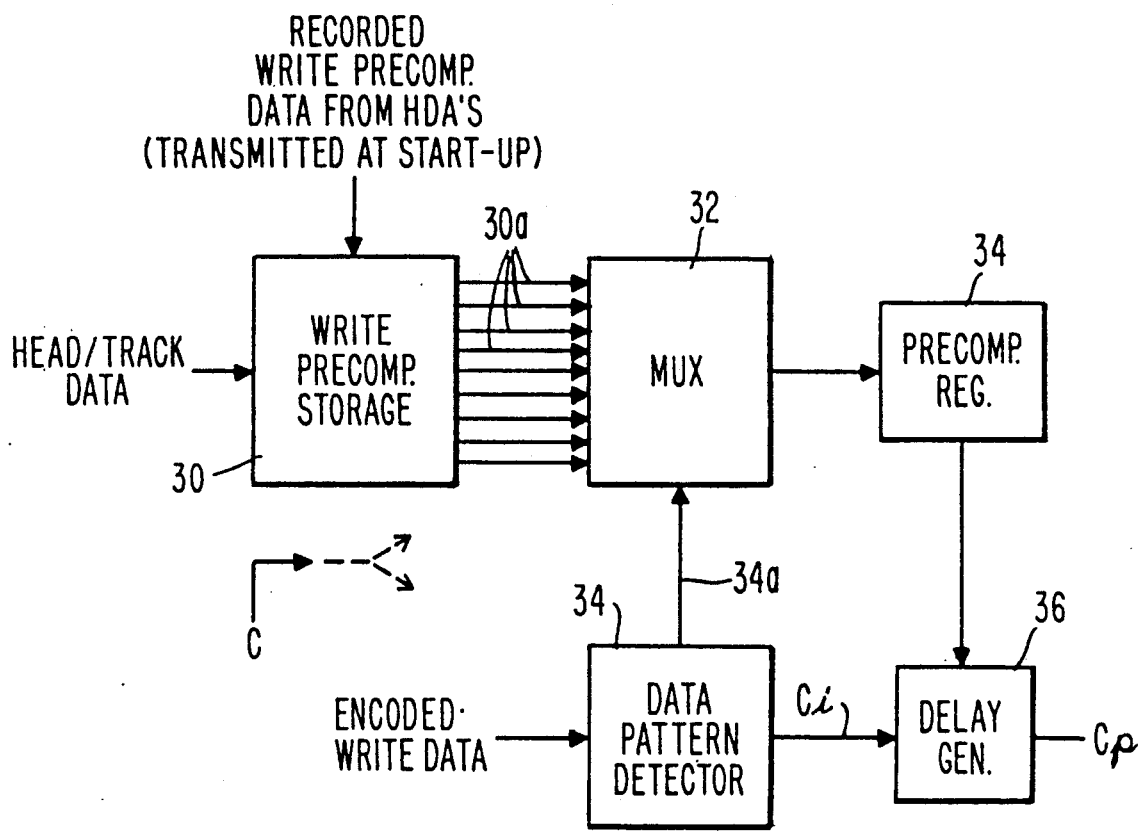
FIG. 3 is an electrical block diagram illustrating the construction and arrangement of the write precompensation circuitry 26 in FIG. 2.

FIG. 3 illustrates the construction and arrangement of the write precompensation circuitry 26 illustrated in block form in FIG. 2. As shown, the write precompensation circuitry 26 includes write precompensation storage 30 (which for example may be a RAM) into which is stored, at start-up time, the write precompensation data recorded on the HDAs. This may be accomplished, for example, using the read/write circuitry 20 to read out the recorded write precompensation data from the surface analysis tracks of each HDA into the write precompensation storage 30. This write precompensation data indicates the data pattern-sensitive write precompensation to be provided for each head/media combination. For example, the write precompensation data recorded on each HDA may contain ten sets of write precompensation data respectively corresponding to the write precompensation to be provided for ten different types of head/media performance characteristics encompassing a relatively wide range of acceptable performance characteristics, each head/media combination of the HDA being assigned the set to which it most nearly corresponds.

As indicated in FIG. 3, prior to each writing operation, head/track selection data is applied to the write precompensation storage 30 indicating the particular head and track (and thus the particular head/media combination) with respect to which writing is to be performed. As is well known, writing of digital data in a track of a magnetic disk typically involves the use of a magnetic head to produce variably spaced magnetic flux changes along the track in a pattern representative of the digital data to be recorded. Accordingly, in response to the applied head/track selection data, the write precompensation storage 30 outputs a corresponding set of recording time modification signals 30a representing the various possible flux change recording time modifications which may be provided when writing a flux change using the selected head and track. More specifically, in the preferred embodiment, each of these signals 30a indicates the write precompensation modification to be provided for recording a flux change using the selected head and track for a respective one of various possible data patterns which may occur immediately preceding and following the flux change to be recorded. For example, if it is assumed that the well known 2/7 write encoding pattern is employed for recording data, the signals 30a would represent the respective write precompensation modification values to be provided for nine different data pattern possibilities which could be present with respect to a flux change to be recorded when a 2/7 encoding pattern is employed.

As shown in FIG. 3, selection of one of the signals 30a is accomplished by applying the recording time modification signals 30a provided by the write precompensation storage 30 to a multiplexor 32 which provides an output 32a representative of a selected one of the applied signals 30a. The selection made by the multiplexor 32 is determined in response to the value of a data pattern selection signal 34a received from a data pattern detector 34 to which the encoded write data from the read/write circuitry in FIG. 2 is applied. This data pattern selection signal 34a is determined based on the detection by the data pattern detector 34 of the particular flux change patterns immediately preceding and following the flux change to be recorded.

It will thus be understood that the resulting selected multiplexor output signal 32a in FIG. 3 provided by the preferred embodiment for use in recording each flux change indicates the recording time modification (if any) which is to be provided when recording a flux change. A particular advantage of this resulting selected multiplexor output signal 32a achieved by the preferred embodiment is that it is especially "tailored" to the selected head/media combination, since the particular set of flux change recording time modification signals 30a produced by the write precompensation storage 30 in FIG. 3 in response to the applied head/track selection data is especially chosen based on the writing and reading characteristics of the respective head/media combination, the required data for this purpose having been stored in the write precompensation storage 30 at start-up time, as described previously.

Continuing with the description of the particular preferred embodiment of the invention illustrated in FIG. 3, the multiplexor output signal 32a produced by the multiplexor 32 is stored in a precompensation register 35 whose output 35a is in turn applied to a delay generator 36 for selecting the delay to be provided for an input clock signal Ci. The input clock Ci is provided by the data pattern detector 34 based upon the time at which each flux change of the data pattern would be recorded if no precompensation were present. Since the precompensated flux change recording time may be earlier as well as equal to or later than the no precompensation recording time, the clock signal Ci is chosen to occur at an appropriate predetermined time earlier than the no precompensation recording time so that the delay generator 36 can produce a resulting precompensated clock Cp (for feeding to the read/write circuitry 20 in FIG. 2) which is capable of providing the full range of flux change recording time modifications indicated by the selected set of signals 30a provided by the write precompensation storage 30. Using a 2/7 write encoding pattern, the total delay range providable by the delay generator 36 may, for example, be 15 nanoseconds.

Figure 4:
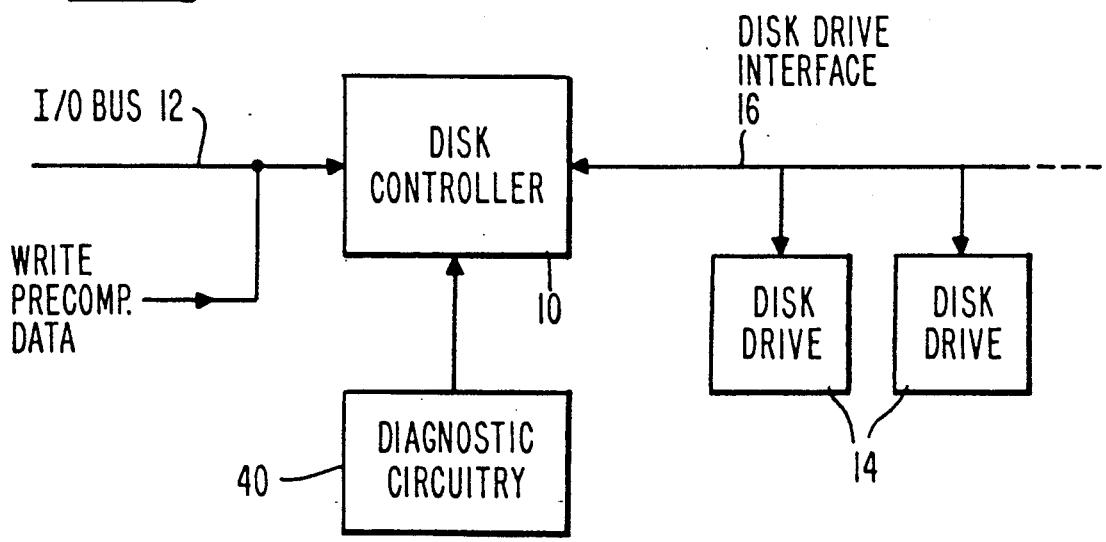
FIG. 4 is an electrical block diagram illustrating the recording of write precompensation data on a disk drive and the diagnosing of head/media performance.

FIG. 4 generally illustrates how write precompensation data may be recorded on an HDA and also how head/media performance can be determined. It will be understood from FIG. 4 that head/media write precompensation data can be recorded on an HDA disk of a disk drive 14 in the same way as other media-related data is conventionally recorded, that is, by appropriately applying the write precompensation data to the controller 10 for writing on the surface analysis tracks of the disks.

As is also conventional, diagnostic circuitry such as illustrated by block 40 in FIG. 4 can be employed in conjunction with the controller 10 to determine whether the recorded write precompensation data for a head/media combination needs to be corrected. For example, if the diagnostic circuitry 40 indicates that the error rate produced by a particular head/media combination is excessive, corrected write precompensated data for that head/media combination can be recorded on the respective disk to replace the previous write precompensation data which produced the excessive error rate. This provides the very important advantage of permitting a head/media combination whose characteristics have degraded to the point where it produces an unacceptable error rate to be brought back into acceptable operation simply by changing its respective recorded write precompensation data without having to remove the disk drive unit for an expensive and time-consuming head replacement, as is now conventionally required.

It is to be understood that the present invention is not to be considered as limited to the particular embodiment described, since various modifications can be made without departing from the scope of the invention. Accordingly, the present invention is to be considered as encompassing all possible modifications and variations coming within the scope of the invention defined by the appended claims.

What is claimed is:

1. A magnetic media storage system comprising:
    controller means for providing control for said system;
    a head/media assembly including a plurality of head/media combinations cooperating with said controller means for writing and reading digital data;
    said assembly having media on which write precompensation data is recorded, said write precompensation data defining write precompensation characteristics for said head/media combinations taking into account performance differences among said head/media combinations;
    said controller means including read/write means for performing a writing operation on said media;
    said controller means also including write precompensation means for providing write precompensation for said writing operation, said precompensation means having write precompensation storage means for storing write precompensation data;
    means for transferring the write precompensation data recorded on said media to said write precompensation storage means for storage therein prior to the performance of writing operations;
    said write precompensation means being operative prior to the performance of a writing operation by a selected head/media combination for accessing from said write precompensation storage means selected bit-shift write precompensation data corresponding to the selected head/media combination and also to the pattern of data to be written;
    said read/write means being responsive to said selected bit-shift write compensation data to perform said writing operation in a manner which takes into account the selected head/media combination as well as the data pattern of the data to be written.

2. The invention in accordance with claim 1, including means for recording write precompensation data on said media.

3. The invention in accordance with claim 1, wherein the recorded write precompensation data is stored in said write precompensation storage means at start-up time.

4. The invention in accordance with claim 1, wherein said head/media assembly is a disk/head assembly, each disk of said assembly containing one or more heads cooperating therewith for reading and writing data in one or more tracks of the disk.

5. The invention in accordance with claim 1, wherein the recorded write precompensation data comprises a plurality of sets of write precompensation data respectively corresponding to the write precompensation data to be provided for a plurality of different types of acceptable head/media performance characteristics, and wherein said selected write precompensation data comprises one of said sets chosen based on said selected head/media combination.

6. The invention in accordance with claim 1, including means for determining whether the recorded write precompensation data needs to be corrected.

7. The invention in accordance with claim 6, including means for changing said recorded write precompensation data.

8. The invention in accordance with claim 1, wherein said selected write precompensation data comprises a plurality of write precompensation signals representing pattern-sensitive modifications to be employed when writing data using said selected head/media combination.

9. The invention in accordance with claim 8, wherein said write precompensation means includes selecting means for successively selecting one of said write precompensation signals in response to the data to be written, and generating means responsive to the selected write precompensation signal for generating a precompensated clock which is applied to said read/write means for controlling writing by said selected head/media combination.

10. The invention in accordance with claim 9, wherein data is written on said media as variably spaced magnetic flux changes, and wherein each write precompensation signal selected by said selecting means is made based on the data patterns occurring in the vicinity of the flux change to be written.

11. The invention in accordance with claim 10, wherein said write precompensation signals respectively indicate the timing modification to be provided when writing a flux change with the selected head/media combination for various possible data patterns which may occur immediately preceding and following the flux change to be written.

12. A method for providing write precompensation in a magnetic media storage system having a controller and a head/media assembly including a plurality of head/media combinations for writing and reading digital data, wherein said head/media combinations exhibit relatively wide variations in performance characteristics, said method comprising:
    recording write precompensation data on media of said assembly defining write precompensation characteristics for said head/media combinations taking into account said variations in performance;
    prior to the performance of writing operations, transferring the write precompensation data recorded on said media to said controller;
    storing the transferred write precompensation data in said controller;
    for each writing operation to be performed by a selected head/media combination, accessing from said write precompensation data transferred to said controller selected bit-shift write precompensation data corresponding to the selected head/media combination as well as to the data pattern to be written;
    deriving from said selected write precompensation data the bit-shift write precompensation modifications, if any, to be provided during writing with the selected head/media combination; and
    performing said writing operation using the derived write precompensation modifications.

13. The invention in accordance with claim 12, wherein said selected write precompensation data comprises a plurality of sets of write precompensation data respectively corresponding to the write precompensation data to be provided for a plurality of different types of acceptable head media performance characteristics.

14. The invention in accordance with claim 12, wherein said head/media assembly is a disk/head assembly, each disk of said assembly containing one or more heads cooperating therewith for reading and writing data in one or more tracks of the disk.

15. The invention in accordance with claim 14, wherein said transferring occurs at start-up time.

16. The invention in accordance with claim 12, including the step of determining whether the recorded write precompensation data needs to be corrected.

17. The invention in accordance with claim 16, including the step of changing the recorded write precompensation data if said determining indicates correction is needed.

18. The invention in accordance with claim 12, wherein said selected write precompensation data comprises a plurality of write precompensation signals representing pattern-sensitive modifications to be employed when writing data using said selected head/media combination.

19. The invention in accordance with claim 18, wherein said deriving includes successively selecting one of said write precompensation signals in response to the data to be written and generating a precompensated clock in response thereto.

20. The invention in accordance with claim 19, wherein data is written on said media as variably spaced magnetic flux changes, and wherein each selection made by said selecting is based on the data patterns occurring in the vicinity of the flux change to be written.

21. The invention in accordance with claim 20, wherein said write precompensation signals respectively indicate the timing modification to be provided when writing a flux change with the selected head/media combination for various possible data patterns which may occur immediately preceding and following the flux change to be written.

* * * * *